Feb. 16, 1960
J. D. LOCONTI ET AL
2,925,498
ATOMIC BURST LOCATORS
Filed Aug. 9, 1957
2 Sheets-Sheet 1
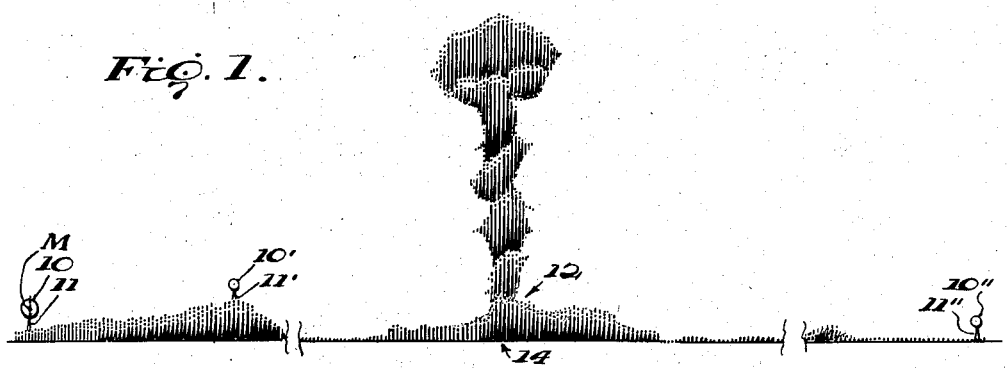
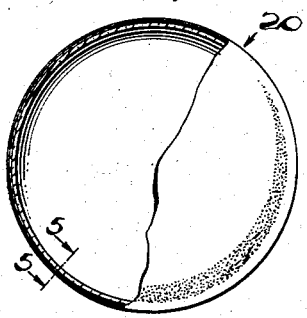
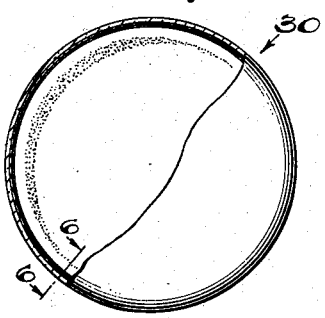
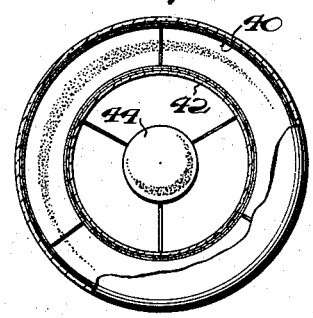
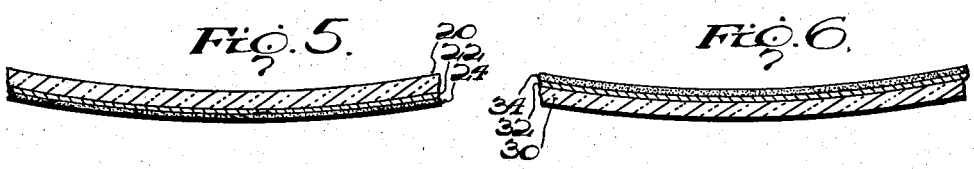
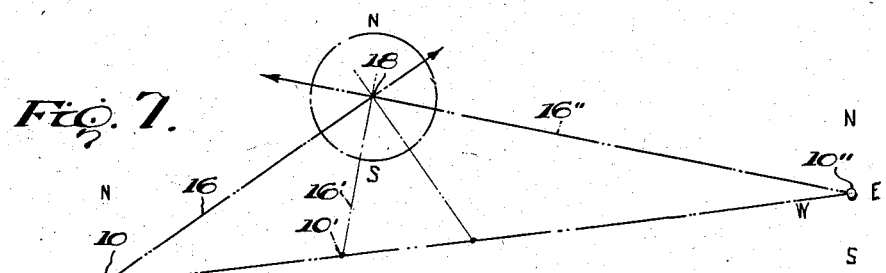
INVENTORS
Joseph D. Loconti, et al.
BY
W. J. Eccleston Feb. 16, 1960
J. D. LOCONTI ET AL
2,925,498
ATOMIC BURST LOCATORS
Filed Aug. 9, 1957
2 Sheets-Sheet 2
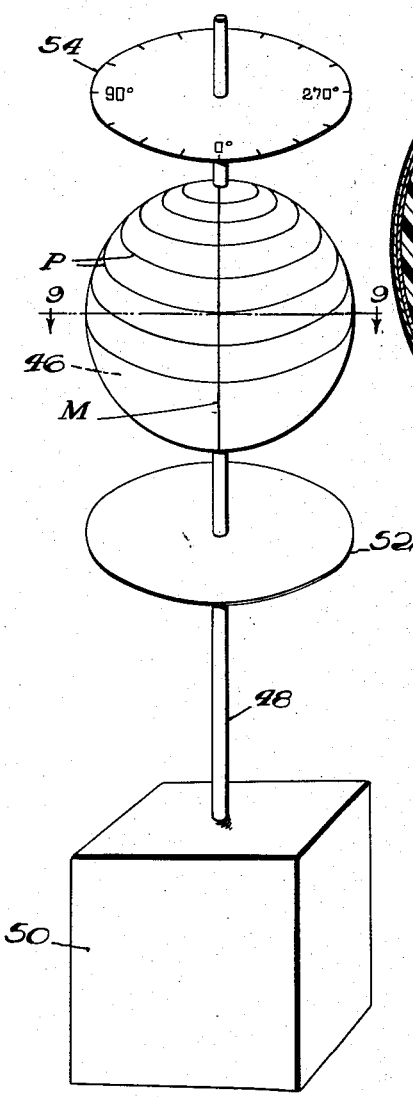
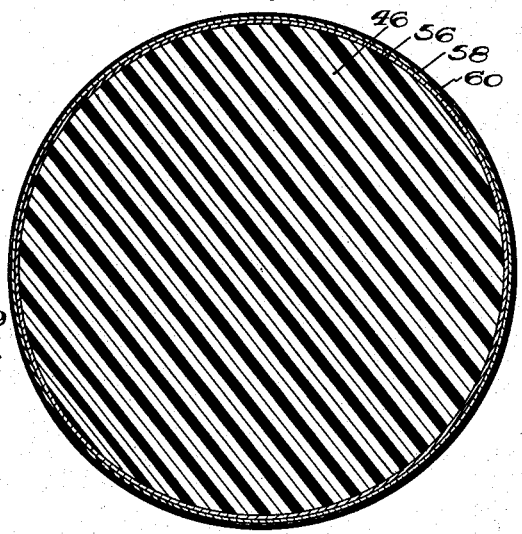
INVENTORS
Joseph D. Loconti, et al
BY W. J. Eccleston,
ATTORNEY

2,925,498

ATOMIC BURST LOCATORS

Joseph D. Loconti, Natick, John M. Davies, Cochituate, and Archibald Stuart Hunter, Harold W. Coles, and Mario R. Altamura, Framingham, Mass., assignors to the United States of America as represented by the Secretary of the Army Application August 9, 1957, Serial No. 677,414

4 Claims. (Cl. 250—83)

(Granted under Title 35, U.S. Code (1952), sec. 266)

The invention described herein, if patented, may be manufactured and used by or for the Government for governmental purposes, without the payment to us of any royalty thereon.

This invention relates to methods and systems for locating sources of intense thermal energy, and more particularly to methods and systems for thermally locating the zero point of a nuclear explosion.

In the event of an attack or war involving nuclear weapons, such as atomic bombs, upon cities, industrial locations, or other important geographical areas, it becomes necessary to be able to designate the zones of destruction and dangerous radioactivity resulting from any nuclear explosions. Such zones are determined with reference to the ground zero point of a nuclear explosion, which is the point on the earth's surface at which the explosion occurred or in the case of an aerial explosion it is the point on the earth's surface directly below the explosion. The various zones of destruction and dangerous radiation may then be described in terms of the radii of circular portions of the earth's surface centered at the ground zero point of the nuclear explosion. Each atomic or nuclear explosion is a source of intense thermal energy, which may be utilized to locate the ground zero point of the explosion.

An object of the present invention is to provide new and improved methods and systems for locating sources of intense thermal energy.

Another object of the invention is to provide methods and systems for thermally locating the zero point of an atomic or nuclear explosion.

A complete understanding of the invention may be obtained from the following detailed description of methods and systems forming specific embodiments thereof, when considered in conjunction with the appended drawing, in which:

Figure 1 is a side elevational view of an atomic explosion at a point on the earth's surface provided with temperature responsive indicator utilized in methods and systems embodying the invention;

Figure 2 is an enlarged top plan view of one type of temperature responsive indicator corresponding to one of the indicators illustrated in Figure 1, with a portion of the indicator broken away to reveal structural details;

Figure 3 is a view similar to Figure 2 of another type of temperature responsive indicator;

Figure 4 is a partially sectional top plan view of still another type of temperature responsive indicator;

Figure 5 is an enlarged transverse section of a portion of the indicator illustrated in Figure 2, along lines 5—5.

Figure 6 is an enlarged transverse section of a portion of the indicator illustrated in Figure 3, along lines 6—6.

Figure 7 is a diagram used in a method embodying the invention to calculate the location of a source of intense thermal energy;

Figure 8 is a perspective view of still another form of a thermal radiation responsive indicator in accordance with our invention; and Figure 9 is a section through the embodiment of Figure 8 along the lines 9—9.

In general, the temperature responsive indicators employed in methods and systems embodying the invention are round-surfaced bodies carrying a special pigment composition which undergoes a substantially permanent change in visual appearance upon exposure to a predetermined elevated temperature. The pigment composition must be sufficiently sensitive to respond to the thermal radiation emitted momentarily during a nuclear explosion several miles away. Furthermore, the change in the visual appearance of the composition must be lasting, in order to permit an observer to detect the change many hours after the blast has occurred.

The special pigment composition carried on or underneath the surface of these bodies may be one of the temperature sensitive compositions described in copending application Serial No. 336,652 filed February 12, 1953 by J. D. Loconti for "Temperature Indicators." Said copending application is directed to coating compositions which accurately, rapidly and irreversibly indicate that a predetermined elevated temperature has been reached by a readily visible change in the color of the composition. The color change results from a physical change rather than a chemical change in the composition. Namely, the change occurs when a normally crystalline pigments melts and is taken up by an absorbent carrier having a color contrasting with the color of the pigment. In most cases the crystalline pigment is white in color, and the absorbent carrier is a black substance, such as finely divided carbon black. Thus, the color changes in such case is from white to black, or from gray to black. Particularly good results are obtained when the crystalline compound and the carbon black, together with a suitable binder, are applied to an absorbent paper backing, such as porous black paper.

The crystalline pigment contained in the temperature sensitive compositions is preferably a white-colored, organic compound having a relatively sharp melting point or transition temperature. Many such compounds have been tested, and a list of compounds which melt at graduated temperatures between 45° C. and 304° C. is tabulated in the aforementioned copending application Serial No. 336,652. By way of example, for triortho cresyl thiophosphate the observed transition temperature is 45° C., for triphenyl phosphate it is 47° C., for stearic acid 68° C., for sucrose octa-acetate 79° C., for hydroquinone bibenzyl ether 127° C., for benzanilide 161° C., for dicyandiamide 204° C., and for theobromine 304° C. Although in most instances the transition temperature, which is the temperature at which a compound appears to change from its solid to its liquid state, is 1° or 2° C. below its true melting point, the two terms are here used interchangeably.

For use in temperate climates, we have found diphenyl phthalate to be a particularly useful white pigment. Its transition point is about 73° C., which prevents its accidental activation by the sun in the temperate zone, but renders it sufficiently sensitive to record an atomic explosion several miles distant.

Due to the crystalline nature of these pigments, they will not adhere to a backing surface unless a binder is present. The composition also should contain a solvent in which the binder is soluble but in which the crystalline compound is insoluble. Water is the preferred solvent. Hence the binder should be an uncolored, water soluble compound. Polyvinyl alcohol or a lower alkyl celluose ether, such as methyl cellulose, are the preferred binders. However, carboxymethy cellulose, pectic acid, plant pectins, and water-soluble gum in general are useful as binders. By forming a water dispersion of the crystalline organic compounds, they are deposited in the form of fine, discrete particles, rather than the continuous, glassy film which would be obtained by the use of an organic solvent.

The crystalline compound, the binder and the solvent may be converted into a coatable slurry by grinding them together in a conventional pebble mill for several hours. The composition of the slurry may vary between wide limits, but preferably it contains from about 5 to 50 parts crystalline pigment, from about 1 to 12 parts binder, and the remainder water to total 100 parts by weight. This slurry may be applied to a backing surface in any convenient manner, to produce a resultant coating having a thickness ranging between about .00005 inch and about .0025 inch. If the coating is too thick, it may be insufficiently absorbed by the porous backing surface when the transition temperature is reached, thereby causing the color change to have less contrast. On the other hand, if the slurry coating is too thin it may be too transparent, and in some cases too likely to rub off, to be of much practical use.

It is evident that when the binder is combined directly with the crystalline pigment and the solvent in the slurry and the resultant slurry is applied to the carrier, the binder has some tendency to interfere with the absorption of the crystalline compound by the carrier when the transition temperature is reached. This effect can be avoided by applying the binder in the form of a top coating over a separate coating of a water dispersion of the crystalline pigment. This top coating must be clear and transparent in order to render visible the subsequently effected color change. The same preferred binders previously described are suitable for this purpose.

The absorbent carrier may exist in several different forms. For example, an absorbent substance, such as finely divided carbon black, may serve as a carrier when intimately mixed directly with the finely divided crystalline pigment, either with or without the binder. That is, the binder may be incorporated in a mixture of the finely divided carbon black and a water dispersion of the crystalline pigment, or the binder may be applied as a separate top coating over a coating of the carbon black and pigment mixture. A carrier may also be formed by preparing a bottom coating from a mixture of finely divided carbon black and a binder. Over this a coating of the pigment and additional binder may be applied as a mixture in one coating, or as two separate coatings with the binder coating on top. Absorbent paper, especially black colored absorbent paper, forms a very suitable carrier. One side of such paper may be coated with the pigment and the binder, either with or without added carbon black, and the other side of the paper may be provided with an adhesive coating to secure it to a body being tested to determine temperature changes thereon. A thin sheet of colored, cellular plastic material, e.g., resinous foam, may also be used as a carrier.

Other absorbent substances may be substituted for the carbon black in the above-described temperature sensitive compositions. For example, iron oxide, copper oxide, copper sulfide, or lead sulfide may be utilized as absorbent carriers, provided they are ground very finely. It is preferred to employ a black colored absorbent carrier and a white colored crystalline pigment in the compositions. However, other compositions which provide sufficient color contrast are satisfactory. Thus, a mixture of 15 parts of dimethyl amino azobenzene (transition temperature 114° C.), 45 parts titanium dioxide, 2.5 parts of 15 cp methyl cellulose, and 175 parts of water appears yellow in color at room temperature when coated onto a white background, and when the temperature is raised above 114° C. this composition turns dark orange in color.

In the fabrication of temperature responsive indicators employed in methods and systems embodying the present invention, the above-described temperature sensitive compositions are coated onto all sides of bodies stationed on the surface of the earth and designed to indicate the direction from which the unobstructed thermal radiations emitted by a nuclear explosion are received. The side of an indicator body directly exposed to such thermal radiations undergoes a substantially permanent change in visual appearance, such as by changing from gray colored to black colored. This change occurs only on the side directly facing the source of radiation, and the other sides of the body remain unchanged in appearance.

When the temperature responsive indicator body is spherical in configuration, the outline of the area of its surface exhibiting the color change will appear circular. An imaginary line drawn from the center of the sphere through the center of this circular area will in its continuation pass through the heat source. By employing a plurality of such spherical indicators in different locations, which may be spaced several miles apart, the exact location of the heat source can be plotted by the process of triangulation, in accordance with methods embodying the invention.

The invention may be further illustrated by referring to Figs. 1 and 7. In Fig. 1 a plurality of spherical temperature responsive indicators 10, 10', 10" are shown mounted on supports 11, 11' and 11", respectively stationed at widely separated points on the earth's surface in the vicinity of an atomic exposion 12 having a ground zero point 14.

Preferably, each sphere carries a reference mark such as meridian line M (etched or otherwise permanently marked) which is oriented to magnetic north (or other predetermined direction such as true north or grid north) when the sphere is installed. Inasmuch as the thermal pulse of an atomic explosion precedes the shock wave, the area of thermal radiation discoloration of the sphere can be realigned with the original position of the sphere, by means of the meridian line, even if the sphere is overthrown by the shock wave.

In Fig. 7 a plurality of phantom lines 16, 16', 16", each of which is drawn through the centers of the visually changed exposed portions of the indicators 10, 10', 10", intersect at a point 18 which corresponds to the zero point 14 of the atomic explosion 12. With the reference mark of each of the indicators 10, 10', 10" oriented to the north, and knowning the geographical locations of the indicators 10, 10', 10", and having the azimuths of the phantom lines 16, 16', 16" with respect to the north direction on a compass, the location of the intersection point 18 can be readily plotted diagrammatically on a map, thereby determining the relative location of the explosion.

Four of these phantom lines have been plotted in Fig. 7, but it is evident that only two of these lines are necessary to determine the intersection point 18. However, some variation in the location of the intersection point 18 as determined by different pairs of the phantom lines 16, 16', 16" must be expected, due to minor inaccuracies in the determination of their azimuths. Hence, in actual practice at least three of the lines 16, 16', 16" would be plotted, thereby giving a cluster of proximate points having the point 18 at their center. Thus, the point 18 is determined by averaging the results. In systems embodying the invention a large number of temperature responsive indicators, such as the spherical indicators 10, 10', 10" are placed in widely scattered locations in the vicinity of a geographical area likely to be attacked by nuclear weapons. Following a nuclear explosion, the visual changes registered by a selected group of these indicators may be observed and used to plot the ground zero point of the explosion in the manner illustrated in Fig. 7.

Temperature responsive indicators, such as the spherical indicators 10, 10', 10", are designed to present a uniform amount of surface area facing all points on the horizon, in order to indicate the direction along the earth's surface in which a nuclear explosion is located. In finding the ground zero point of the explosion, it is unnecessary to determine the elevation of the explosion, even in the case of an aerial bomb. Consequently, the indicators are not limited to a spherical or hemispherical configuration. In general the indicators are round-surfaced bodies circular in cross-section and preferably symmetrical in configuration. Thus, the indicator bodies may take the form of a sphere, hemisphere, cone, cylinder, or any other geometrical shape having a substantial portion circular in cross-section. However, a spherical shape is much preferred for practical reasons.

One type of spherical temperature responsive indicator is illustrated in detail in Figs. 2 and 5. This indicator comprises a hollow sphere 20, which may be made of glass or a hard plastic composition, having an outside coating of the previously described temperature sensitive compositions. A layer 22 of finely divided carbon black or an equivalent absorbent black colored carrier is coated directly on the outside of the sphere 20. One of the previously described binders may be mixed with the carbon black to secure the layer 22 to the sphere 20. Next, a layer 24, containing as previously described, a finely divided, crystalline, organic pigment mixed with a suitable binder, is coated onto the carrier layer 22. If desired, a clear, weather-resistant, transparent outer layer (not shown), composed of one of the binder compounds or a suitable resinous film, may be applied over the pigment layer 24 to provide protection against weathering and handling damage.

In the embodiment illustrated in Figs. 2 and 5, the sphere 20 is hollow, but since the temperature sensitive coating is on the outside of the sphere, equivalent results would be obtained if the sphere 20 were solid. In such case the sphere 20 could be made of glass, plastic, metal, wood or asbestos. Furthermore, the sphere 20 could be formed entirely from black papier mache, or some other absorbent material, e.g., a colored cellular resinous foam, such as polystyrene foam, thereby eliminating the need for the layer 22 of carbon black, but in such case a weatherproof protective coating should be provided. It is also possible to eliminate the layer 22 by incorporating the carbon black into the pigment layer 24, but the presence of a separate layer of carbon black is preferred. In the event the sphere 20 is hollow and transparent, it is advisable to fill it with an inert material, such as sand, talc, vermiculite, or heat-resistant resinous foam, such as polystyrene foam, to prevent the possibility of having radiation pass through one side of the sphere and activate the opposite side thereof.

Figs. 3 and 6 shows a hollow transparent sphere 30 having its inside surface coated with the temperature sensitive composition. A layer 32 composed of one of the finely divided, crystalline, organic pigments mixed with a compatible binder is coated directly onto the inside surface of the sphere 30. The layer 32 may be formed by a spraying operation or by pouring a coatable slurry into the sphere and draining out the excess. Then a layer 34 composed of finely divided carbon black mixed with a binder is coated onto the layer 32. In this construction the sphere itself protects the inner layers from the damaging effects of weathering and handling. However, the interposition of the glass or plastic sphere body between the heat source and the temperature sensitive layer 32, renders this arrangement less sensitive to heat radiation than the type of structure shown in Figs. 2 and 5.

A wide range of sensitivity to thermal radiations is obtainable from the indicator illustrated in Fig. 4. In this embodiment, an outer transparent sphere 40, an intermediate transparent sphere 42 and an inner sphere 44 are mounted concentrically one within the other. The three spheres 40, 42 and 44 may be coated with either the same or different temperature sensitive pigments. Hence, in case the external heat source is great enough to activate the coating on all sides of the outer sphere 40 completely, the direction of the heat source may be indicated by the intermediate sphere 42. The presence of the inner sphere 44 within the other two spheres permits the detection of still greater thermal radiations. The temperature sensitive coatings may be applied to either the interior or the exterior surfaces of the concentric spheres 40, 42 and 44.

In Figures 8 and 9, we illustrate another and presently preferred form of our invention. A sphere 46 made of light resinous cellular foam, e.g., polystyrene foam having an apparent density of 3 lbs./cu. ft., is mounted on a rigid vertical mounting rod 48 of steel, aluminum or other suitable material, which rod is firmly embedded in a mounting base 50 of concrete or other suitable material. The mounting base 50 is embedded in the ground and so aligned that meridian line M on the sphere 46 faces north. In order to protect the sphere from thermal radiation reflected from the ground (which otherwise would affect the accuracy of the indication), a ground reflectance shield 52 may also be mounted on rod 48 intermediate between the sphere 46 and the mounting base 50. If desired, a solar radiation shield 54 may be provided above sphere 46 to prevent accidental discoloration of the latter by intense solar heat. A compass rose on either shield 52 or 54 facilitates direction finding on those indicators which have not been dislocated by the shock wave.

As shown in somewhat exaggerated form in Figure 9, the sphere 46 of Figure 8 carries a solid-color undercoat 56 (e.g., black paint), a thermal radiation sensitive coating 58, e.g., a mixture of 900 parts diphenyl phthalate, 45 parts methyl cellulose binder, 18 parts non-ionic surface-active agent, and 12 parts carbon black (which mixture is preferably applied from an aqueous slurry), and a clear weather-resistant overcoating 60, e.g., of transparent lacquer, such as an acrylate.

Parallel horizontal circles P may be provided on the sphere by etching or other permanent marking, in order to determine the height of an atomic airburst by simple geometrical calculations once the distance of ground zero has been determined by triangulation.

The size of the temperature responsive indicators utilized in systems embodying the invention may vary considerably, e.g., from a few inches diameter to a diameter of one foot or more.

It will thus be seen that we have provided a thermal-radiation-responsive indicator system characterized by low cost so that many of them can be placed throughout a probable target area, and further characterized by accuracy, sensitivity and simplicity in design. Our indicators after once having been emplaced, need little or no maintenance.

It should be understood that other types of temperature sensitive compositions and other types of temperature responsive indicators may be employed to obtain equivalent results in methods and systems embodying the invention. Numerous changes may be made to suit special conditions without departing from the spirit and the scope of the invention as defined by the appended claims.

We claim:

1. A thermal responsive device for indicating the location of a source of intensive thermal radiation such as a nuclear explosion, comprising a spherical body mounted to receive unobstructed radiation from all points on the horizon, said spherical body being heat-resistant resinous cellular foam having a solid color base coating, an intermediate thermally sensitive coating comprising a finely divided absorbent carbon black carrier, a finely divided normally crystalline organic white pigment having a relatively sharply defined predetermined melting point substantially above ambient temperature and a compatible binder for uniting said carrier and said organic pigment, and a clear transparent protective outer coating; whereby when said pigment melts as a result of thermal radiation emanating from a distant nuclear explosion it is absorbed by said carrier and thereby causes a substantially permanent change in the color of that portion of the surface of said device which faces in the direction of said source of intense thermal radiation.

2. A thermally responsive device according to claim 1, wherein said heat-resistant resinous cellular foam is polystyrene foam.

3. A thermally responsive device according to claim 1, wherein said pigment is diphenyl phthalate.

4. A device according to claim 1, wherein two substantially horizontal discs are mounted respectively above and below said spherical body and spaced from said spherical body so as to provide solar radiation shielding and ground reflectance shielding for preventing premature color change of said device by thermal radiation other than that caused by a nuclear explosion.

References Cited in the file of this patent

UNITED STATES PATENTS

| | | |
|---|---|---|
| 1,924,793 | Laske | Aug. 29, 1933 |
| 2,615,249 | Allard | Oct. 28, 1952 |
| 2,696,050 | Taylor | Dec. 7, 1954 |
| 2,799,167 | Loconti | July 16, 1957 |
| 2,826,073 | Huyck | Mar. 11, 1958 |

FOREIGN PATENTS

| | | |
|---|---|---|
| 732,737 | Great Britain | June 29, 1955 |